United States Patent [19]

Juza et al.

[11] 4,330,645
[45] May 18, 1982

[54] PREPARATION OF PROPYLENE HOMOPOLYMERS OR COPOLYMERS

[75] Inventors: Dirk Juza, Wesseling; Dieter Stein, Limburgerhof, both of Fed. Rep. of Germany

[73] Assignee: BASF Aktiengesellschaft, Fed. Rep. of Germany

[21] Appl. No.: 249,691

[22] Filed: Mar. 31, 1981

[30] Foreign Application Priority Data

Apr. 19, 1980 [DE] Fed. Rep. of Germany ....... 3015089

[51] Int. Cl.$^3$ ............................ C08F 2/34; C08F 10/06
[52] U.S. Cl. ........................................ 526/61; 526/68; 526/88; 526/901
[58] Field of Search ............................ 526/61, 68, 88

[56] References Cited

U.S. PATENT DOCUMENTS

| | | | |
|---|---|---|---|
| 3,944,534 | 3/1976 | Sennari et al. | 526/88 |
| 4,012,573 | 3/1977 | Trieschmann et al. | 526/61 |
| 4,061,848 | 12/1977 | Sistig et al. | 526/61 |
| 4,129,701 | 12/1978 | Segl et al. | 526/68 |

FOREIGN PATENT DOCUMENTS 1354020  5/1974  United Kingdom .

*Primary Examiner*—Edward J. Smmith
*Attorney, Agent, or Firm*—Keil & Witherspoon

[57] ABSTRACT

A process for the preparation of propylene homopolymers or copolymers by polymerizing the monomer or monomers in the gas phase in a centric stirred bed of finely divided polymer, with removal of the heat of polymerization by evaporative cooling, the temperature in the polymerization zone being regulated by measuring the temperature continuously and causing any change therein to trigger a change in the amount of liquid monomer, evaporating in the reaction zone, which is introduced per unit time, in which process (1) the radius and height of the centric stirred bed are in a particular ratio to one another, (2) the finely divided polymer in the centric stirred bed is caused to move upward in the peripheral zone of the bed and downward in the central zone of the bed, (3) the temperature in the polymerization zone is regulated by simultaneously measuring it at (3.1) one or more points of the inner part of the stirred bed and (3.2) one or more points of the outer part of the stirred bed and (4) the actual temperatures T determined simultaneously at the individual points of measurement are combined to give a temperature parameter $T_M$ and the difference of this parameter from the intended value triggers the regulating sequence, or the temperature differences $\Delta T$ between the actual and intended temperatures, measured simultaneously at the individual points of measurement, are combined to give a difference parameter $\Delta T_M$ and this parameter triggers the regulating operation.

1 Claim, No Drawings

PREPARATION OF PROPYLENE HOMOPOLYMERS OR COPOLYMERS

The present invention relates to a process for the preparation of propylene homopolymers, or of propylene copolymers which contain more than 50, in particular more than 80, percent by weight of propylene and less than 50, especially less than 20, percent by weight of other α-monoolefins of 2 to 6, especially of 2 to 4, carbon atoms, as copolymerized units, by polymerizing the corresponding monomer or monomers, hereafter referred to for brevity as the monomer, by means of a catalyst, especially a Ziegler-Natta catalyst, at from 40° to 150° C., especially from 50° to 110° C., under a pressure of from 10 to 50 bar, especially from 15 to 40 bar, in the gas phase, in a centric stirred bed, having radius r and height h, of finely divided polymer, with removal of the heat of polymerization by evaporative cooling, wherein the monomer is introduced continuously or periodically into a polymerization zone and the polymer is discharged continuously or periodically from the polymerization zone, with the provisos that (a) in the polymerization zone the pressure and temperature are kept in a range which corresponds to the gaseous state of the monomer, (b) gaseous monomer not consumed by the polymerization is discharged from the polymerization zone, liquefied, stored and reintroduced, as liquid, into the polymerization zone, (c) the temperature in the polymerization zone is regulated by continuously measuring the temperature and causing any change therein to trigger a change in the amount of liquid monomer, evaporating in the reaction zone, which is introduced per unit time, and (d) replacing the monomer consumed by polymerization through supplying fresh monomer.

Processes of this type are known and can be very successfully operated in industry.

In the present context, particularly relevant prior art is disclosed in German Published Application DAS 2,049,622 (=British Pat. No. 1,354,020), which may be regarded as essentially constituting the basis of the process according to the present invention.

It is an object of the present invention to develop the known process so that it can be operated even more successfully. The essential aims in this respect are to increase the period of time over which the process can be operated without problems, and to improve the constancy, with time, of the properties of the products, specifically including their morphological properties.

We have found that this object is achieved if the process defined at the outset is so designed that the following measures are combined:

(1) the centric stirred bed is chosen to have a certain size, (2) the finely divided polymer in the stirred bed is agitated in a certain manner, (3) the temperature measuring points which serve to regulate the temperature in the polymerization zone are located in specific geometrical zones of the stirred bed and (4) the values which come from the individual temperature measurement points are combined, with a certain weighting, to give a regulating parameter, and this is used to trigger the regulating operation.

Accordingly, the present invention relates to a process for the preparation of propylene homopolymers, or of propylene copolymers which contain more than 50, in particular more than 80, percent by weight of propylene and less than 50, especially less than 20, percent by weight of other α-monoolefins of 2 to 6, especially of 2 to 4, carbon atoms, as copolymerized units, by polymerizing the corresponding monomer or monomers, hereafter referred to for brevity as the monomer, by means of a catalyst, especially a Ziegler-Natta catalyst, at from 40° to 150° C., especially from 50° to 110° C., under a pressure of from 10 to 50 bar, especially from 15 to 40 bar, in the gas phase, in a centric stirred bed, having radius r and height h, of finely divided polymer, with removal of the heat of polymerization by evaporative cooling, wherein the monomer is introduced continuously or periodically into a polymerization zone and the polymer is discharged continuously or periodically from the polymerization zone, with the provisos that (a) in the polymerization zone the pressure and temperature are kept in a range which corresponds to the gaseous state of the monomer, (b) gaseous monomer not consumed by the polymerization is discharged from the polymerization zone, liquefied, stored and reintroduced, as liquid, into the polymerization zone, (c) the temperature in the polymerization zone is regulated by continuously measuring the temperature and causing any change therein to trigger a change in the amount of liquid monomer, evaporating in the reaction zone, which is introduced per unit time, and (d) replacing the monomer consumed by polymerization through supplying fresh monomer, in which process (1) in the centric stirred bed, the relation $r:h = 1:1$ to $1:3$, especially $1:1.2$ to $1:2$, applies, (2) the finely divided polymer in the centric stirred bed is caused to move upward in the peripheral zone of the stirred bed and downward in the central zone of the stirred bed, in such a way as to give a Froude number of from 0.4 to 5, especially from 0.6 to 3.5, in the stirred bed, (3) the temperature in the polymerization zone is regulated by simultaneously measuring the temperature (3.1) at one or more points of the geometrically cylindrical inner part of the stirred bed which is defined by the relation $h.\pi.a^2$, where a is the innermost one-tenth of the radius r of the centric stirred bed, and (3.2) at one or more points of the outer part of the stirred bed, geometrically in the shape of a symmetrical hollow cylinder, defined by the relation $h.\pi.r^2 - h.\pi.a^2$, with the provisos that the total number of measurement points is not greater than ten and that the radial distance between a measurement point in the inner part (3.1) and a measurement point in the outer part (3.2) of the stirred bed is not less than one-tenth of r, and (4) the actual temperatures T determined simultaneously at the individual points of measurement are combined to give a temperature parameter $T_M$ and the difference of this parameter from the intended value triggers the regulating operation, or the temperature differences $\Delta T$ between the actual and intended temperatures, measured simultaneously at the individual points of measurement, are combined to give a difference parameter $\Delta T_M$ and this parameter triggers the regulating operation, with the proviso that in combining the actual temperatures T or the temperature differences $\Delta T$, each individual measured value has a weighting of not less than $40/n\%$, where n is the total number of measurement points, in the temperature parameter $T_M$ or the difference parameter $\Delta T_M$.

The following points of detail may be noted in respect of the process according to the invention:

(A) Materials

The monomer to be polymerized can be the relevant conventional monomer, ie. propylene alone or a mixture of propylene with one or more other $C_2$–$C_6$-$\alpha$-monoolefins, eg. ethylene, n-but-1-ene, n-hex-1-ene or 4-methylpent-1-ene. We have found that the process according to the invention is particularly suitable for the preparation of propylene homopolymers, binary copolymers of propylene and ethylene and ternary copolymers of propylene, ethylene and n-but-1-ene. The polymers are obtained in a finely divided form, as a grit of varying fineness, the particle size depending, as in the relevant conventional processes, on the process conditions chosen. The polymer particle diameter is in general from about 0.03 to 10 mm and in particular from about 0.1 to 5 mm. Agglomeration of the particles to give larger secondary particles can be substantially avoided in the process according to the invention, and this has an advantageous effect on the morphological properties of the products.

The polymerization is carried out using a catalyst, and the relevant conventional catalysts may be used, in particular those of the Ziegler-Natta type. Amongst the very great range of catalysts of the last-mentioned category, it has proved particularly advantageous to use two-component catalyst systems comprising (I) a titanium trichloride component and (II) an aluminum-alkyl component of the general formula $AlR_3$ or $ClAlR_2$, where R is $C_1$–$C_8$-alkyl, the atomic ratio of titanium from component (I) to aluminum from component (II) being from 1:1 to 1:100.

Within the range of these two-component catalysts, a variety of titanium trichloride components (I) are known, of which the following four groups, which are also suitable for use in the process according to the invention, may be singled out:

(Ia) Titanium trichlorides as such and titanium trichloride co-crystals with metal halides, especially those with aluminum chloride, having the approximate formula $TiCl_3 \cdot \frac{1}{3}AlCl_3$. Cf., for example, U.S. Pat. Nos. 3,128,252 and 3,814,743.

We have found that from amongst this group a very finely divided co-crystalline material of the formula $TiCl_3 \cdot \frac{1}{3}AlCl_3$ is particularly suitable for the purposes according to the invention.

(Ib) Titanium trichlorides or titanium trichloride co-crystals, of the type described under (Ia), modified with electron donors or with Lewis bases. There are numerous embodiments of such modified titanium trichloride catalyst components, since they are known to offer a range of advantages. To avoid unnecessary repetition, reference may be made, in the relevant context, to British Pat. No. 851,113 and French Pat. No. 1,231,089.

This group is very suitable for the purposes of the present invention; specifically, very suitable materials are very finely divided co-crystals of the formula $TiCl_3 \cdot \frac{1}{3}AlCl_3$, which are modified with the following donors or bases: ethers, eg. diisoamyl ether and diisopentyl ether; esters, eg. isoamyl benzoate and ethyl phenylacetate; phosphines, eg. tributylphosphine; phosphine oxides, eg. tributylphosphine oxide, and acid amides, eg. hexamethylphosphorotriamide.

The individual manner of modification may be of the relevant conventional type, specific examples of modifications particularly suitable for the purposes of the present invention being those described in German Laid-Open Applications DOS Nos. 2,301,136, 2,400,190, 2,441,541, 2,519,582, 2,658,936, 2,658,937, 2,658,939, 2,739,382, 2,713,552 and 2,722,123.

(Ic) Pre-activated titanium trichlorides and titanium trichloride co-crystals of the type described under (Ia). These are titanium trichloride catalyst components which, before actual mixing with the aluminumalkyl component (II), are pre-activated with aluminumalkyl compounds of the same type. Frequently, titanium tetrachloride which has been reduced to titanium trichloride by means of the aluminum-alkyl compound is used as the starting material.

(Id) Titanium trichlorides and their co-crystals, which have been both modified with electron donors or Lewis bases, and pre-activated. Such titanium trichloride catalyst components can in a sense be regarded as a combination of those described under (Ib) and (Ic). A typical example is to be found in German Laid-Open Application DOS No. 2,335,047.

Overall, therefore, the materials used in the process according to the invention are to be found amongst the relevant conventional materials.

(B) Process technology

The process is basically derived from the methods of preparation of homopolymers or copolymers of propylene in the gas phase, as disclosed, for example, in German Published Applications DAS Nos. 1,217,071, 1,520,307 and 1,520,373. The general principles of this prior art are, regardless of their age, fully applicable to the novel process, so that more detailed explanation is superfluous.

More specifically, the process according to the invention is essentially based, as stated at the outset, on the process disclosed in German Published Application DAS No. 2,049,622 and therefore does not require any special explanation.

However, the following is to be noted in respect of the characterizing features of the process according to the invention:

(1) In the centric stirred bed, the relation radius r:height h=1:1 to 1:3, especially from 1:1.2 to 1:2, must apply.

(2) The finely divided polymer in the centric stirred bed is caused to move upward in the peripheral zone of the stirred bed and downward in the central zone of the stirred bed, in such a way as to give a Froude number of from 0.4 to 5, especially from 0.6 to 3.5, in the stirred bed.

This condition of the stirred bed can in practice readily be achieved, by a skilled worker, through appropriate application of the teaching of German Laid-Open Application DOS No. 2,539,103, especially if a spiral stirrer, as described in German Pat. No. 1,218,265 or European Laid-Open Application 512, is used.

(3) The temperature in the polymerization zone is regulated by simultaneously measuring the temperature (3.1) at one or more points of the geometrically cylindrical inner part of the stirred bed which is defined by the relation $h.\pi.a^2$, where a is the innermost one-tenth of the radius r of the centric stirred bed, and (3.2) at one or more points of the outer part of the stirred bed, geometrically in the shape of a symmetrical hollow cylinder, defined by the relation $h.\pi.r^2 - h.\pi.a^2$, with the provisos that the total number of measurement points is not greater than ten and that the radial distance between a measurement point in the inner part (3.1) and a measurement point in the outer part (3.2) of the stirred bed is not less than one-tenth of r.

This measure is particularly important an ensuring the success of the process according to the invention.

We have found that in practice it is attractively simple, and at the same time very efficient, to employ one measurement point in the inner part (3.1) and one measurement point in the outer part (3.2) of the stirred bed, the former point being in the middle or lower one-third of the stirred bed and the latter point being in the upper or middle one-third of the stirred bed, and the radial distance between the two points being 0.1-1.1 r.

It may however also prove appropriate to employ more than a total of two measurement points, for example if the stirred bed is relatively large and/or if a relatively large amount of heat of polymerization is generated per unit time.

The temperature measurement as such can be carried out by relevant conventional equipment, for example thermocouples; the methods are familiar to a skilled worker and require no further explanation here.

(4) The actual temperatures T determined simultaneously at the individual points of measurement are combined to give a temperature parameter $T_M$ and the difference of this parameter from the intended value triggers the regulating operation, or the temperature differences $\Delta T$ between the actual and intended temperatures, measured simultaneously at the individual points of measurement, are combined to give a difference parameter $\Delta T_M$ and this parameter triggers the regulating operation, with the proviso that in combining the actual temperatures T or the temperature differences $\Delta T$, each individual measured value has a weighting of not less than 40/n%, where n is the total number of measurement points, in the temperature parameter $T_M$ or the difference parameter $\Delta T_M$.

This feature of the process according to the invention contributes to keeping the desired continuously steady state of the polymerization very constant over as long a period as possible. Accordingly, the start-up phase of the process according to the invention, ie. the actual start and its subsequent optimization, until the desired state is reached, will, as is conventionally the case, be carried out under manual control, after which process control according to (4) will be employed. Of course, the optimum temperatures found, for the inner and outer part of the stirred bed, in the final stage of the start-up phase according to (3) will constitute the intended values for the operation of (4), and the influence, ascertained in the final stage of the start-up phase, of the individual actual temperatures T or individual temperature differences $\Delta T$, at the various measurement points, on the outcome of the process will indicate the relative weighting of these measured values in respect of triggering the regulating operation.

We have found in practice that if two measurement points are used, ie. when combining the actual temperature $T_{3.1}$ in the inner part (3.1) with the actual temperature $T_{3.2}$ in the outer part (3.2) of the stirred bed to give the temperature parameter $T_M$, it is in general advantageous to combine these values in accordance with the equation $$T_M = f \cdot T_{3.1} + (1-f) \cdot T_{3.2}$$

where $f = 0.25-0.75$; if the values of $T_{3.1}$ and $T_{3.2}$ which have been found to be the optimum, as mentioned above, are inserted in this equation, it correspondingly gives the intended value of the temperature parameter $T_M$.

The corresponding data processing can readily be carried out even with relatively simple equipment; the ultimately resulting pulse increases or decreases the amount of liquid monomer introduced per unit time into the reaction zone, and accordingly increases or decreases the removal of heat. The specific techniques employed can be the relevant conventional techniques.

EXAMPLE 1

A stirred reactor having an internal diameter of 2.7 m and a useful volume of about 25 m³ is employed; the stirrer is constructed as in FIG. 1 of European Laid-Open Application 512.

A propylene homopolymer is prepared in the reactor by polymerizing propylene with a Ziegler-Natta catalyst at from 75° to 90° C., under a gas-phase pressure of 30 bar, in a centric stirred bed of finely divided polymer, the particle diameters being from 0.1 to 5 mm.

The Ziegler-Natta catalyst used consists of (I) a titanium trichloride component which has been prepared as described in Example 2 of German Laid-Open Application DOS No. 2,400,190 and (II) an aluminum-alkyl component, namely diethyl-aluminum chloride. These catalyst components are introduced separately into the polymerization zone at the rate of 660 g/h of component (I) and 1,700 g/h of component (II), corresponding to a molar ratio of Ti from (I) to Al from (II) of 1:5.

The other basic conditions are chosen in accordance with German Published Application DAS No. 2,049,622 so that the heat of polymerization is removed by evaporative cooling, the monomer is introduced continuously into the polymerization zone and the polymer (produced at about 2,000 kg/h) is removed periodically from the polymerization zone, with the provisos that (a) in the polymerization zone the pressure and temperature are kept in a range which corresponds to the gaseous state of the monomer (this requirement being met by the conditions mentioned above), (b) gaseous monomer not consumed by the polymerization (about 11,000 kg/h) is discharged from the polymerization zone, liquefied, stored and reintroduced, as liquid, into the polymerization zone, (c) the temperature in the polymerization zone is regulated by continuously measuring the temperature and causing any change therein to trigger a change in the amount of liquid monomer, evaporating in the reaction zone, which is introduced per unit time, and (d) replacing the monomer consumed by polymerization through supplying fresh monomer.

Specifically, the polymerization process is so designed, in accordance with the invention, that (1) in the centric stirred bed, the relation radius r:height h = 1:1.2 applies, (2) the finely divided polymer in the centric stirred bed is caused to move upward in the peripheral zone of the stirred bed and downward in the central zone of the stirred bed, in such a way as to give a Froude number of 1.0, (3) the temperature in the polymerization zone is regulated by simultaneously measuring the temperature (3.1) at one point of the geometrically cylindrical inner part of the stirred bed which is defined by the relation $h \cdot \pi \cdot a^2$, where a is the innermost one-tenth of the radius r of the centric stirred bed, namely directly along the axis of the stirred bed, in the middle one-third of the bed, and (3.2) at one point of the outer part of the stirred bed, geometrically in the shape of a symmetrical hollow cylinder, defined by the relation $h.\pi.r^2-h.\pi.a^2$, namely at 68 cm distance from the axis of the stirred bed, in the upper one-third of the bed, so that the radial distance between the measurement point in the inner part (3.1) and the measurement point in the outer part (3.2) of the stirred bed is about 5-tenths of r, and (4) the actual temperatures T determined simultaneously at the two measurement points are combined to give a temperature parameter $T_M$, after which the regulating operation is triggered by the difference between $T_M$ and the intended value (=80° C.), with the proviso that on combining the actual temperatures T, each of the two measured values is present with a weighting of 50% in the parameter $T_M$.

This corresponds to combining the actual temperature $T_{3.1}$ in the inner part (3.1) with the actual temperature $T_{3.2}$ in the outer part (3.2) of the stirred bed to give the temperature parameter $T_M$ in accordance with the equation $$T_M = f.T_{3.1} + (1-f).T_{3.2}$$

where $f=0.5$; correspondingly, the same equation, when inserting the optimum temperatures found, namely 75° C. for $T_{3.1}$ and 85° C. for $T_{3.2}$, also gives the intended value of $T_M$, namely 80° C.

In this way, the polymerization process can be operated for months without problems; furthermore, the properties of the polymer obtained, in particular including the morphological properties, prove to be very constant with time.

EXAMPLE 2

Example 1 is repeated, but with the following changes in respect of (3) and (4):

(3) The temperature in the polymerization zone is regulated by simultaneously measuring the temperature (3.1) at one point of the geometrically cylindrical inner part of the stirred bed which is defined by the relation $h.\pi.a^2$, where a is the innermost one-tenth of the radius r of the centric stirred bed, namely directly along the axis of the stirred bed, in the lower one-third of the bed, and (3.2) at three points of the outer part of the stirred bed, geometrically in the shape of a symmetrical hollow cylinder, defined by the relation $h.\pi.r^2-h.\pi.a^2$, namely (3.2.1) at 68 cm distance from the axis of the stirred bed, in the middle one-third of the bed, (3.2.2) at 68 cm distance from the axis of the stirred bed, in the upper one-third of the bed, and (3.2.3) at 135 cm distance from the axis of the stirred bed, in the middle one-third of the bed, so that the radial distance between the measurement point in the inner part (3.1) and the measurement points in the outer part (3.2) of the stirred bed is about 5-tenths of r for (3.2.1) and (3.2.2) and about 10-tenths of r for (3.2.3).

(4) The temperature differences $\Delta T$, between the actual and intended temperatures, determined simultaneously at the individual measurement points, namely (4.1) $\Delta T_1$ at measurement point (3.1), with an intended temperature of 75° C., (4.2.1) $\Delta T_{2.1}$ at measurement point (3.2.1), with an intended temperature of 88° C., (4.2.2) $\Delta T_{2.2}$ at measurement point (3.2.2), with an intended temperature of 85° C., and (4.2.3) $\Delta T_{2.3}$ at measurement point (3.2.3), with an intended temperature of 78° C., are combined to give a difference parameter $\Delta T_M$, which serves to trigger the regulating operation, with the proviso that in combining the temperature differences, the weighting of the individual differences in the difference parameter $\Delta T_M$ is 25% for $\Delta T_1$, 50% for $\Delta T_{2.1}$, 12.5% for $\Delta T_{2.2}$ and 12.5% for $\Delta T_{2.3}$.

The results are as good as in Example 1.

We claim:

1. A process for the preparation of propylene homopolymers, or of propylene copolymers which contain more than 50 percent by weight of propylene and less than 50 percent by weight of other α-monoolefins of 2 to 6 carbon atoms, as copolymerized units, by polymerizing the corresponding monomer(s) by means of a catalyst, at from 40° to 150° C., under a pressure of from 10 to 50 bar, in the gas phase, in a centric stirred bed, having radius r and height h, of finely divided polymer, with removal of the heat of polymerization by evaporative cooling, wherein the monomer is introduced continuously or periodically into a polymerization zone and the polymer is discharged continuously or periodically from the polymerization zone, with the provisos that (a) in the polymerization zone the pressure and temperature are kept in a range which corresponds to the gaseous state of the monomer, (b) gaseous monomer not consumed by the polymerization is discharged from the polymerization zone, liquefied, stored and reintroduced, as liquid, into the polymerization zone, (c) the temperature in the polymerization zone is regulated by continuously measuring the temperature and causing any change therein to trigger a change in the amount of liquid monomer, evaporating in the reaction zone, which is introduced per unit time, and (d) replacing the monomer consumed by polymerization through supplying fresh monomer, in which process (1) in the centric stirred bed, the relation r:h=1:1 to 1:3 applies, (2) the finely divided polymer in the centric stirred bed is caused to move upward in the peripheral zone of the stirred bed and downward in the central zone of the stirred bed, in such a way as to give a Froude number of from 0.4 to 5, (3) the temperature in the polymerization zone is regulated by simultaneously measuring the temperature (3.1) at one or more points of the geometrically cylindrical inner part of the stirred bed which is defined by the relation $h.\pi.a^2$, where a is the innermost one-tenth of the radius r of the centric stirred bed, and (3.2) at one or more points of the outer part of the stirred bed, geometrically in the shape of a symmetrical hollow cylinder, defined by the relation $h.\pi.r^2-h.\pi.a^2$, with the provisos that the total number of measurement points is not greater than ten and that the radial distance between a measurement point in the inner part (3.1) and a measurement point in the outer part (3.2) of the stirred bed is not less than one-tenth of r, and (4) the actual temperatures T determined simultaneously at the individual points of measurement are combined to give a temperature parameter $T_M$ and the difference of this parameter from the intended value triggers the regulating operation, or the temperature differences ΔT between the actual and intended temperatures, measured simultaneously at the individual points of measurement, are combined to give a difference parameter $\Delta T_M$ and this parameter triggers the regulating operation, with the proviso that in combining the actual temperatures T or the temperature differences ΔT, each individual measured value has a weighting of not less than 40/n%, where n is the total number of measurement points, in the temperature parameter $T_M$ or the difference parameter $\Delta T_M$.

* * * * *